United States Patent [19]

Szalai et al.

[11] 4,158,971
[45] Jun. 26, 1979

[54] PLANETARY VEHICLE DRIVES

[75] Inventors: Gábor Szalai; Andor Opitz; János Pálinkás, all of Györ, Hungary

[73] Assignee: Magyar Vagon- es Gepgyar, Gyor, Hungary

[21] Appl. No.: 843,852

[22] Filed: Oct. 20, 1977

[30] Foreign Application Priority Data

Oct. 21, 1976 [HU] Hungary .............................. MA 2818

[51] Int. Cl.² .................... F16H 35/00; F16H 1/28
[52] U.S. Cl. ........................................ 74/801; 74/391
[58] Field of Search .............. 74/391, 801; 180/43 B, 180/65 F; 192/4 A

[56] References Cited

U.S. PATENT DOCUMENTS

| 3,150,532 | 9/1964 | Bixby | 74/391 |
| 3,365,986 | 1/1968 | Mazziotti | 180/43 B X |
| 3,382,958 | 5/1968 | Fagel | 192/4 A |
| 4,010,830 | 3/1977 | Logus et al. | 192/4 A |
| 4,020,716 | 5/1977 | Toth et al. | 74/391 X |
| 4,037,694 | 7/1977 | Keese | 192/4 A |

*Primary Examiner*—Samuel Scott
*Assistant Examiner*—Randall L. Green
*Attorney, Agent, or Firm*—Young & Thompson

[57] ABSTRACT

Two-stage power branching planetary transmission wheel drive having an inner planetary gear set and an outer planetary gear set. The inner planetary gear set has its planetary carrier loosely splined to a fixed support or hollow spindle of the wheel drive while its gear ring is splined to the gear ring of the outer planetary gear set the planetary carrier of which is, in turn, splined to the sun gear of the inner planetary gear set, roller type antifriction wheel bearings which journal the wheel hub of the assembly being both supported by the torque support or reaction element of the drive.

5 Claims, 1 Drawing Figure

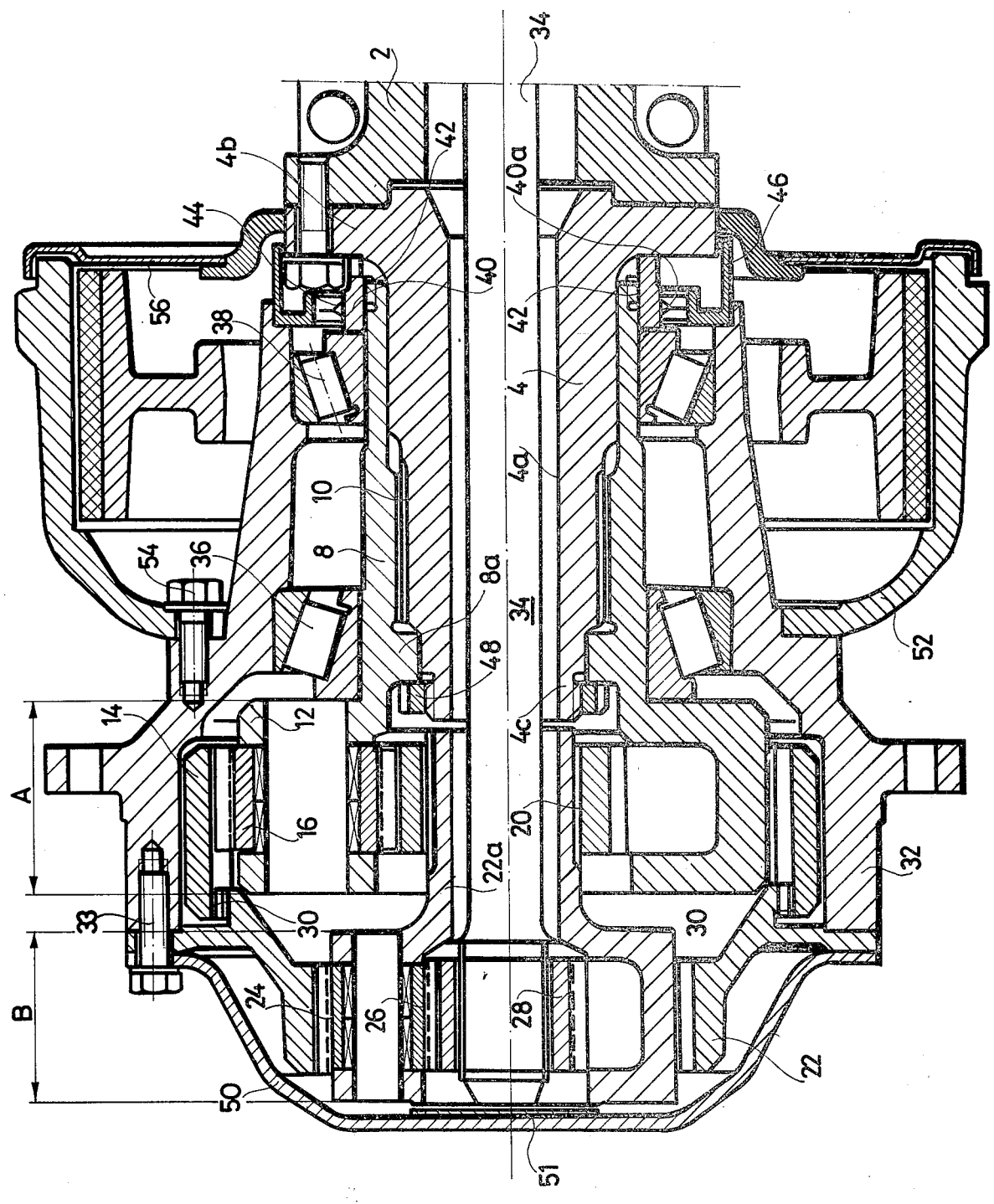

PLANETARY VEHICLE DRIVES

This invention relates to planetary high gear ratio transmission wheel drive mechanisms, particularly for heavy duty power vehicles.

BACKGROUND OF THE INVENTION

In known prior art of heavy duty power vehicles it has been common practice to employ two or more planetary transmissions in series or parallel connection and mounted within the hub of a driving wheel as described e.g. in U.S. Pat. No. 3,150,532. However, such known wheel drive mechanisms are difficult to assemble since their various component parts can be mounted on the fixed support or spindle of a power vehicle only one after the other whereby both space and time requirements become relatively high.

A further difficulty is experienced at adjusting and mounting the wheel hub bearings. Namely, while fitting of most component parts of such drives is close and relatively coarse, bearings require fine adjustment and exact measuring of clearances which are of considerable importance as regards their lifetimes. Consequently, manufacturing of such hub wheel is very cumbersome and expensive.

The main object of the present invention is to provide an improved planetary transmission wheel drive with which mounting is considerably facilitated, and yet, fine adjustment and exact measuring of bearing clearances is reliably ensured while all advantages of known two-stage planetary wheel hub trnasmissions are still present.

SUMMARY OF INVENTION

This is obtained with a planetary transmission wheel drive mechanism having an inner planetary gear set and an outer planetary gear set. The inner planetary gear set has its planetary carrier loosely splined to a fixed support or hollow spindle of the wheel drive while its gear ring is splined to the gear ring of the outer planetary gear set the planetary carrier of which is, in turn, splined to the sun gear of the inner planetary gear set as is usual with such two-stage power branching planetaries. However, the roller type antifriction wheel bearings which journal the wheel hub of the assembly are both supported by the torque support or reaction element of the drive. This is in contrast to known devices such as described in the above mentioned U.S. Patent Specification where an inboard wheel bearing is directly mounted on the hollow spindle or fixed support by which the wheel drive is connected to the axle housing of the vehicle. The significance of such expedient consists in that the antifriction wheel bearings of the wheel hub are capable of being adjusted and, in their adjusted positions, fixed to the torque support by means of a threaded abutment ring. Then, the torque support with the wheel hub and possibly with the gear ring and the planetary pinion gears of the inner planetary transmission gear set will be splined to the hollow spindle and fixed in its axial position by a linch hoop or spindle nut without entailing any change in the already adjusted positions of the antifriction wheel bearings.

Further parts of the planetary wheel drive mechanism may be connected to the already mounted unit in a very simple manner as will be seen hereinbelow where closer details will be described by taking reference to the accompanying drawing.

BRIEF DESCRIPTION OF THE DRAWING

The drawing shows an exemplified embodiment of the planetary transmission wheel drive mechanism according to the invention and the single FIGURE of it is a longitudinal sectional view of the new device.

DESCRIPTION OF PREFERRED EMBODIMENT

In the drawing, reference numeral 2 designates an axle housing which forms a part of the running gear of a power vehicle such as a tractor not shown. The axle housing 2 has a fixed support or hollow spindle 4 with a bore 4a and a shoulder 4b fixed to it by bolts such as bolt 6. Fixed support 4 carries a torque support or reaction element 8 loosely splined to it at 10. The torque support 8 is, in the instant case, integral with the planetary carrier of an inboard planetary gear set which could be formed by a separate component part and, therefore, is designated by a further reference numeral 12. However, an integral torque support and planetary carrier facilitates to observe tolerances, besides being considerably cheaper. The inboard planetary gear set consists of a ring gear 14, planetary gears 16, and a sun gear 18. The sun gear 18 of inboard planetary gear set 14, 16, 18 is splined at 20 to a planetary carrier 22 having an axially bored extension 22a and forming part of an outboard planetary gear set consisting of ring gear 24, planetary gears 26 and sun gear 28. The ring gear 24 of outboard planetary gear set 24, 26, 28 is loosely splined at 30 to the ring gear 14 of inboard planetary gear set 14, 16, 18. Dependent on its clearance, loose splining 30 permits mutual radial and circumferential displacements of torque transmitting ring gears 14 and 24. Thus, only one of them has to be connected with a wheel hub 32 to be driven. Driving force is transmitted by a drive shaft 34 extending through bores 4a and 22a of a hollow spindle 4 and planetary carrier 22, respectively, while the other ring gear is floating. In the instant case it is ring gear 24 which is fixed to wheel hub 32 by means of bolts such as bolt 23. The advantage of such arrangement consists in that, then, the ring gear of the inboard planetary gear set which carries a greater load and, therefore, comprises, as a rule, more than three planetary gears, is floating and capable of free selfadjustment.

The wheel hub 32 is rotatably mounted on a pair of roller type antifriction wheel bearings 36 and 38 of which antifriction wheel bearing 36 is an outboard wheel bearing while antifriction wheel bearing 38 is an inboard wheel bearing. In accordance with the main feature of the invention, also inboard wheel bearing 38 is carried by the torque support or reaction element 8 in contrast to known devices where it is generally fixed to the hollow spindle directly. As has been mentioned above, such expedient is mainly responsible for avoiding the inconveniences of known devices in the field, and more particularly for permitting an exact and well defined adjustment of both wheel bearings 36 and 38 which is then exempt from any further changes which otherwise might have been brought about by mounting operations.

Wheel bearings 36 and 38 are piloted in both the torque support 8 and the wheel hub 32 so as to exactly define their mutual axial and radial positions. The inner extremity of torque support 8 is provided with outer threads which mesh with inner threads of a correspondingly threaded abutment ring 40 as shown at 42. The outer surface 40a of abutment ring 40 is cylindrical and serves as the running surface for a sealing ring 44 located in a ring shaped casing 46 whereby a further component part as well as its space may be saved, and a more compact structure obtained.

At its front extremity, the torque support 8 has a shoulder 8a which is piloted on hollow spindle 4 in concentric alignment as shown. On the other hand, the front extremity of hollow spindle 4 forms a threaded journal 4c which engages a linch hoop or spindle nut 48 suitable to abut against shoulder 8a.

Reference character 50 designates a hub end plate fixed to the wheel hub 32 by the bolts 33, and reference character 51 designates a friction disc well known in the art.

Furthermore, with the represented embodiment, the wheel hub or rotatable support 32 carries a brake drum 52 which is fixed to it by means of bolts such as bolt 54 and may be closed by a brake backing plate 54 in a usual manner. Such combination facilitates mounting operations since the brake drum 52 forms with the wheel hub or rotatable unit, as it were, a constructional unit.

In operation, the illustrated embodiment of the planetary transmission wheel drive mechanism works in the conventional way: drive shaft 34 drives outboard planetary gear set 24, 26, 28 the planetary carrier 22 of which transmits a portion of the torque of drive shaft 34 to the inboard planetary gear set 14, 16, 18. The branched powers are transmitted to the wheel hub 32 by the ring gear 24 of the outboard planetary gear set 24, 26, 28 which is splined to the ring gear 14 of the inboard planetary gear set 14, 16, 18, and fixed to the wheel hub 32 by the bolts 33.

In mounting, first the outboard wheel bearing 36 and the inboard wheel bearing 38 are placed between the torque support 8 and the wheel hub 32 from opposite directions. Then the abutment ring 40 is threaded onto the torque support 8 until the wheel bearings 36 and 38 occupy their piloted positions wherein outboard wheel bearing 36 lies against shoulders of torque support 8 and wheel hub 32, and inner board wheel bearing 38 abuts against a shoulder of wheel hub 32 as shown in the drawing. Obviously, both wheel bearings 36 and 38 can be finely adjusted and their clearances exactly measured.

Thus, a constructional unit consisting of torque support 8, wheel bearings 36 and 38, wheel hub 32, and abutment ring 40 is obtained which can be handled in a selfcontained manner.

This unit is then complemented with the sealing ring 40 and its casing 46. The brake drum 50 is fixed to the wheel hub 32. The ring gear 14 and the planetary gears 16 are likewise placed in position. Thus, constructional unit 8, 32, 36, 38, 40, ring gear 14, planetary carrier 12 and planetary gears 16 form a selfcontained subassembly which, in the instant case, comprises the ring gear 14, the planetary gears 16 of the inboard planetary transmission gear set and the break drum 52, and which can be pushed onto the hollow spindle 4 and fixed to it by the linch hoop 48. It will be seen that with tightening linch hoop 48, until abutment ring 40 abuts against the shoulder 46 of hollow spindle 4, the subassembly 8, 12, 14, 16, 32, 36, 38, 40 will occupy and be fixed in its desired position on hollow spindle 4 without the positions or loads of wheel bearings 36 and 38 being changed in whatever manner.

In a final mounting operation the outboard planetary gear set 24, 26, 28 with the sun gear 18 of the inboard planetary gear set 14, 16, 18 on its planetary carrier 22 is splined to drive shaft 34 and ring gear 14, and fixed, together with hub end plate 50, to the wheel hub 32.

What we claim is:

1. In a planetary high gear ratio transmission wheel drive mechanism, particularly for heavy duty power vehicles, a hollow spindle or fixed support (4) with an axial bore (4a), a torque support or reaction element (8) splined (10) to said hollow spindle or fixed support (4), an outboard antifriction bearing (36) and an inboard antifriction bearing (38) on said torque support or reaction element (8), a wheel hub or rotatable support (32) on said antifriction bearings (36, 38), a threaded abutment ring (40) on said torque support or reaction element (8) for axially adjusting said antifriction bearings (36, 38) between said torque support or reaction element (8) and said wheel hub or rotatable support (32), a linch hoop or spindle nut (48) on said hollow spindle or fixed support (4) arranged for abutting against a shoulder (8a) of said torque support or reaction element (8), an inboard planetary gear set (14, 16, 18) having a ring gear (14), a planetary carrier (12), planetary gears (16) and a sun gear (18), an outboard planetary gear set (24, 26, 28) having a ring gear (24), planetary gears (26), a planetary carrier (22) with an axially bored extension (22a), and a sun gear (28), and a drive shaft (34) extending through the bore (4a) of said hollow spindle or fixed support (4) and said bored extension (22a) of said planetary carrier (22), and splined to the sun gear (26) of said outboard planetary gear set (24, 26, 28), the ring gear (18) of said inboard planetary gear set (14, 16, 18) being arranged in said wheel hub or rotatable support (32) and loosely splined (30) with the ring gear (24) of said outboard planetary gear set (24, 26, 28), the planetary carrier (12) of said inboard planetary gear set (14, 16, 18) being fixed to said torque support or reaction element (8), the axially bored extension (22a) of said planetary carrier (22) of said outboard planetary gear set (24, 26, 28) being splined to the sun gear (18) of said inboard planetary gear set (14, 16, 18), said torque support or reaction element (8), said outboard wheel bearing (36), said inboard wheel bearing (38), said wheel hub or rotatable support (32), said threaded abutment ring (40), said ring gear (14), planetary carrier (12) and planetary gears (16) of said inboard planetary gear set (14, 16, 18) forming a selfcontained subassembly (8, 12, 14, 16, 32, 36, 38, 40).

2. In a wheel drive mechanism as claimed in claim 1, the further improvement of the torque support or reaction element (8) thereof being integral with the planetary carrier (12) of its inboard planetary gear set (14, 16, 18).

3. In a wheel drive mechanism as claimed in claim 1, the further improvement of the threaded abutment ring (40) thereof having a cylindrical outer surface (40a) serving as the running surface for a sealing ring (44) between the abutment ring (40) and the wheel hub or rotatable support (32).

4. In a wheel drive mechanism as claimed in claim 1, the further improvement of the ring gear (24) of the outboard planetary gear set (24, 26, 28) thereof being fixed (33) to the wheel hub or rotatable support (32).

5. In a wheel drive mechanism as claimed in claim 1, the further improvement of the wheel hub or rotatable support (32) of the subassembly (8, 12, 14, 16, 32, 36, 38, 40) having a brake drum (52) fixed to it.

* * * * *